(12) United States Patent
Chiang et al.

(10) Patent No.: US 7,742,878 B2
(45) Date of Patent: Jun. 22, 2010

(54) BIO-EXPRESSION SYSTEM AND THE METHOD OF THE SAME

(75) Inventors: Ann-Shyn Chiang, Hsin Chu (TW); Yung-Chang Chen, Hsin Chu (TW); Chaung Lin, Hsin Chu (TW); Yu-Tai Ching, Hsin Chu (TW); Chuan Yi Tang, Hsin Chu (TW); Hsiu-Ming Chang, Hsin Chu (TW)

(73) Assignee: National Tsing Hua University, Hsin Chu (TW)

( * ) Notice: Subject to any disclaimer, the term of this patent is extended or adjusted under 35 U.S.C. 154(b) by 1352 days.

(21) Appl. No.: 11/169,890

(22) Filed: Jun. 30, 2005

(65) Prior Publication Data

US 2007/0020599 A1 Jan. 25, 2007

(51) Int. Cl.
*G01N 33/53* (2006.01)
*G06F 7/00* (2006.01)

(52) U.S. Cl. .............................. 702/19; 702/20; 703/11; 435/6; 435/7.1; 345/418

(58) Field of Classification Search .................. 702/19, 702/20; 703/11; 435/6, 7.1; 345/418
See application file for complete search history.

(56) References Cited

U.S. PATENT DOCUMENTS 6,381,562 B2 * 4/2002 Keane ......................... 703/11
6,472,216 B1 10/2002 Chiang

OTHER PUBLICATIONS

Chiang, A-S., et al., "radish Encodes a Phospholipase-A2 and Defines a Neural Circuit Involved in Anesthesia-Resistant Memory", Current Biology, vol. 14, pp. 263-272, (2004), Elsevier Science Ltd.
Iijima, K., et al., "Dissecting the pathological effects of human Aβ40 and Aβ42 in *Drosophila*: A potential model for Alzheimer's disease", PNAS, vol. 101, No. 17, pp. 6623-6628, (2004), The National Academy of Sciences of the USA.
Rein, K., et al., "Three-dimensional Reconstruction of the *Drosphila* Larval and Adult Brain", FLYBRAIN. acc. AB00120-AB00127, available from University of Arizona, identified as "neurobio.arizona.edu" (2000 Flybrain, compiled by Hiesinger, Peter Robin), (2000).

* cited by examiner

*Primary Examiner*—Mary K Zeman
(74) *Attorney, Agent, or Firm*—Jerald L. Meyer; Derek Richmond; Stanley N. Protigal

(57) ABSTRACT

The bio-expression system comprising: a process system used to process data and a three-dimension image generating module embedded in the computing system, wherein while input of a set of two-dimensional individual model sections is fed into the process system, the three-dimension image generating module is responsive to the input of the two-dimension individual model sections and is capable of processing an individual model construction and model-averaging procedure, thereby generating an average model for each individual dataset. A database includes a bio-expression sub-database, cellular network sub-database and fine structure sub-database, wherein the database is coupled to the process system to store at least the average model. A stereoscopic projecting system is coupled to the process system to display stereoscopic images for active or passive virtual reality applications, thereby presenting the bio-expressions, cellular networks or bio-fine structures under the input instruction of the process system.

17 Claims, 5 Drawing Sheets
(3 of 5 Drawing Sheet(s) Filed in Color)

BIO-EXPRESSION SYSTEM AND THE METHOD OF THE SAME

FIELD OF THE INVENTION

The present invention relates to a system of bio-expression, and more specifically, to present a high resolution images of cellular network(s) in terms of gene (or protein) expression.

BACKGROUND OF THE INVENTION

Genetic and behavioral analysis has been developed for identifying the function of genes. For example, numerous methods are developed in effort for disease modeling, such as the production of germ-line transgenic animal models (e.g. transgenic mice and other animals with specific genetic characters). However, practically, a major obstacle in performing gene/disease analysis on transgenic mammals is the long life span of animals. It takes too long (a few years at least) in the laboratory to trace diseases evolving from abnormal genes in one animal. Many researches on disease treatments could be delayed because scientists had not a swift and easy access to the source of pathogenesis at the molecular level for accurate identification. One remedy for the situation is to utilize some relevant systems in short life-spanned (only days from birth to mature) insects as models. For example, the brain of fruit flies (*Drosophila melanogaster*) has been used to investigate the pathogenesis of Alzheimer disease. Please refer to the article "A *Drosophila* model of Alzheimer's disease: dissecting the pathological roles of Aβ42 and Aβ40", to K. Iijima, Proc. Natl. Acad. Sci. USA, vol. 101, 6623-6628, 2004. Likewise, studies on early detection and treatment of numerous diseases may become more efficient in the future if a good correlation among genes, cellular structures and diseases can be established successfully in a fly model. The benefit resulted will be not only on science but also on public health that many new treatments with better accuracy can be found for diseases, especially for those are gene related.

Up to now, no research or application employs the computer-assisted system to inspect the real environment at the cellular level in biotechnology, although some applications relate to computerized medical diagnostic systems are available. New technology is needed to help observing the wholeness of the article at its finest level that cannot be detected by the conventional optical technology. Recently, three-dimension reconstruction technology has been developed that allows rebuilding the three dimensional image of cells, thereby providing the tool to understand the fine structure of them. However, such technology focuses on a single cell or only few cells cultured in an artificial environment (in vitro) instead of in the real body (in vivo). The difference between the two environments is more significant in the field of neural science. The distribution of neurons is really three-dimensional in the body, but they are plated in a two-dimensional situation in cell cultures. It is unlikely that a two-dimensional environment simulates the three-dimensional neural networks in the body. Currently, some approaches struggle to observe the neural system in three-dimensional environment. However, the approaches are restricted by the penetration depth of the optical system that is hardly capable of looking through the depth deeper than 50-micron meter by using visible light. One attempt for reconstruction of individual wild type *Drosophila* larval and adult brains was described in Karlheinz Rein, Peter Robin Hiesinger, Malte Zöckler, Jan Kirsten, Karl-Friedrich Fischbach, and Martin Heisenberg. (2000), "Three-dimensional Reconstruction of the *Drosophila* Larval and Adult Brain", FLYBRAIN. acc. AB00120-AB00127, available from University of Arizona, identified as "neurobio.arizona.edu" (2000 Flybrain, compiled by Hiesinger, Peter Robin). In similar studies, the fruit fly has become one of the prime model systems in brain research. Its brain (about 600.times.250.times.150 micrometers) consists of about 200,000 neurons. Given this relatively small brain, the fly shows a surprisingly complex repertoire of behaviors, e.g. orientation, courtship, learning and memory. The whole brains were dissected from heads, sliced and labeled fluorescently for inspections. However, in this way and in all prior methods, the whole neural circuitry in the fly brain is impossible to be reconstructed reasonably due to its physical damages from tissue slicing and the limited depth of view in each observation. Our invention provides a complete and novel resolution to overcome this barrier.

Virtual reality technology has progressed into practical and useful applications. These applications have found utility in a wide variety of fields and industries. One application is known as training and researching applications. Virtual reality training applications allow users to develop important skills and experience without subjecting them to the hazards or costs of training. Virtual reality is a computer-generated environment in which a user is immersed. Actions of the user are translated by a computer into inputs that effect the virtual environment (VE). Virtual reality systems may stimulate naturally occurring senses, so that a user can navigate through a virtual environment as if in the real world. However, never a virtual reality system has been used to explore the cellular networks in a biological tissue at high resolution (in the range of few micrometers).

Although images of biological cells at high resolution have been available for a long time but hardly any cellular network (such as neural networks in an intact brain) has been revealed anatomically, let along interactions among different networks. Current technology for medical imaging is capable of generating series of images for database construction, however not only the revelation of cellular structures are not intended but also the genetic information is hardly associated with the anatomy. Therefore, our purpose is to provide a way of combining high resolution biological structural database (such as neural networks), system of gene (protein) expression in biological tissues and a visual demonstration in virtual reality. Such a system should be modular to allow expansion for multiple types of gene (protein) expression to correlate the anatomy and the function (or dysfunction) to the molecular level. In this way, the correlations among genes, cellular networks and biological functions can be examined and manipulated in the most realistic environment. Biological function simulation may be achieved when detailed cellular networks and genetic information are realistically available.

SUMMARY OF THE INVENTION

In view of above-mentioned, the object of the present invention is to disclose a system of bio-expression and the method of the same.

The object of the present invention is to disclose a 3D presenting system for cellular networks. The bio-expression system includes high resolution cellular network (referred as cellular network there after) database, virtual reality projecting system, which allows presenting the gene (or protein) expression and the connections among cells at their entirety through out the tissue at high resolution. Other party could link the bio-expression system and the database via network if necessary.

The further object of the present invention is to discover and catalog gene expressions under normal or abnormal conditions. It also provides the technique to image within a broad spectrum of soft biological tissues (such as mammalian brains) with high resolution.

In accordance with the present invention, the bio-expression system comprises a process system used to process data and a three-dimensional image generating module embedded in the process system, wherein while an input of two-dimensional individual model sections is fed into the process system, an average model module is responsive to the input two-dimensional individual model sections and is capable of processing an individual three-dimensional model reconstruction and model-averaging procedure, thereby generating an average model from a set of individual models. A database can be categorized into a gene (or protein) expression sub-database, a cellular network sub-database and fine structure sub-database, wherein the database is coupled to the process system to store at least the average model. A stereoscopic projecting system is coupled to the process system to display three dimensional images for active or passive virtual reality applications, thereby presenting gene (or protein) expression within cellular networks or bio-fine structures under input instructions from the process system.

The model-averaging procedure includes two averaging stages of different levels. The system further comprises standard bio-geographic index sub-database which allows the calibration and comparison between different individual data. In one embodiment, the biological networks presented are classified in accordance with gene (or protein) expressions, individual growth, developmental or some experience dependent procedures. The cellular networks sub-database establishes a functional linkage between certain functions (or dysfunctions) and cellular entities.

A method of generating the presentation by a bio-expression system comprises a step of inputting individual model sections to a process system of the bio-expression system for data processing and invoking an average model generating module embedded in the bio-expression system through the process system, wherein the average model generating module is responsive to the input of individual model sections to perform an individual model reconstruction and model-averaging procedure, thereby generating an average model from the input datasets for a cellular structure. A coarse level model averaging is performed by the system introducing the average model generating module. The procedure starts from partitioning each individual model into several significant parts with a user interface in the process system. A skeleton is determined by the average model generating module from the corresponding principal axis for each significant part in individual models and a local coordinate system is established for each individual model. Translocation and rotation are performed to bring each local coordinate into a global coordinate system. An average skeleton is then calculated after taking all principle axes from all individual models into consideration.

Then, with the 3D field-based warping algorithms established within the average model generating module in the process system, original models are remodeled so that to best match the averaged skeleton. Pseudo-average models are thus constructed.

Following that, the volumetric solid object is estimated for each pseudo-average model by applying a 3D seed-fill algorithm to convert the volumetric hollow object to a volumetric solid object. Finally, the geometric median for all pseudo-average models is determined as the best contour for the average model.

BRIEF DESCRIPTION OF THE DRAWINGS

The file of this patent contains at least one drawing executed in color. Copies of this patent with color drawing(s) will be provided by the Office upon request and payment of the necessary fee.

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
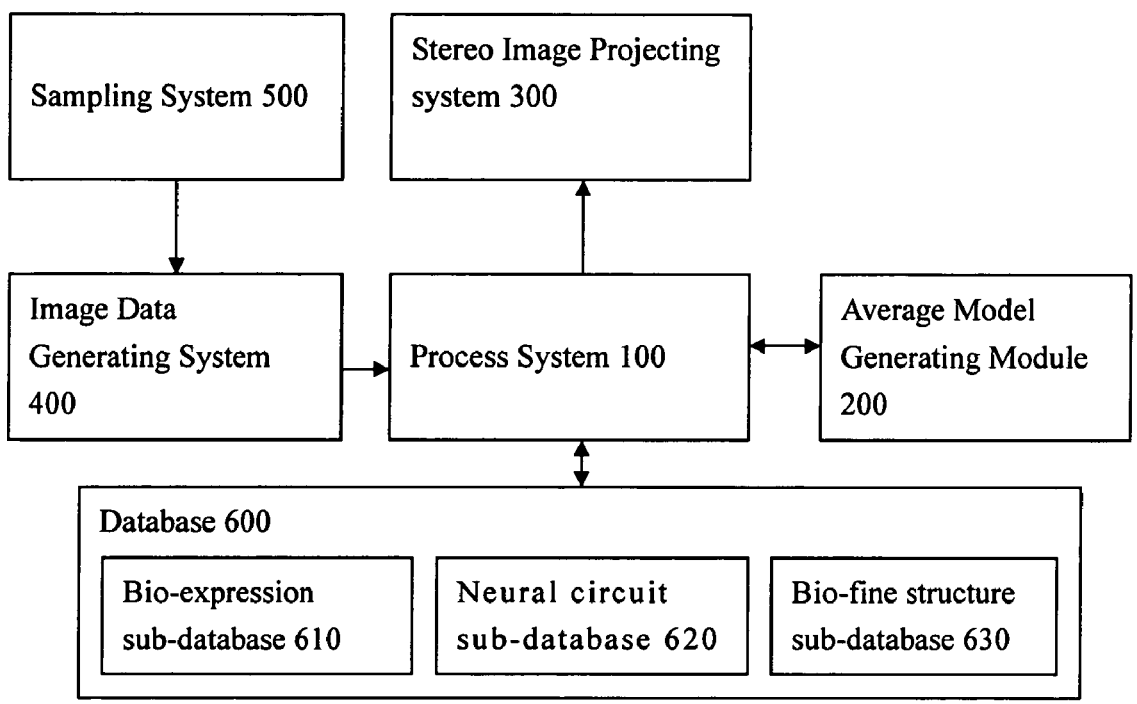
FIG. 1 illustrates the system diagram according to the present invention.

Referring now to the drawings and the following description wherein the showings and description are for the purpose of illustrating the preferred embodiments of the present invention only, and not for the purpose of limiting the same. The present invention provides cellular networks database and system for gene expression in the bio-organization, one preferred example is gene expression in fruit fly brains. Such an expressing system should be modular to allow expansion for multiple types of gene with different functions.

System of Presenting the Gene Expression

Please refer to FIG. 1, the bio-expression system 10 of the present invention includes a computing process system 100 used to process and compute the data and information under certain instruction. The bio-expression system collects and presents the bio-characters. In one example, the system may allow to analyze and define a neural circuit involved in any scientific investigation, medical-related diagnosis or artistic exhibition. As know in the art, the high-performance computer with advance CPU could be employed to achieve the goal. An average model generating module 200 is embedded in the process system 100 to transfer the input two-dimension image data such as a set of individual model sections to a three-dimension image. In one preferred embodiment, one commercial product application or software AMIRA (v3.1, Mercury Computer Systems Inc. USA) could be introduced to achieve the purpose. As known in the art of the three-D graphic technology, the image data could be calculated by the process system 100 introducing the average model generating module 200 to generate reconstructed three-dimension stereoscopic image.

Initially, the input data is prepared by the sample preparation system 500 and the image data generating system 400. The sampling system 500 is employed to generate the target sample for the bio expression system 10. In one embodiment, the fruit fly brain (about 600×250×150 micrometers in its adult brain) is used for illustration. As will be understood by persons skilled in the art, the foregoing preferred brain organization of the fly embodiment is illustrative of the present invention rather than limiting the present invention. The whole tissue of fly brain can be obtained by the well-know manner, followed by increasing its degree of light transparency to about 0.15 mm or deeper with a technique invented by one of our inventors, please refer to the U.S. Pat. No. 6,472,216 B1, filed on Oct. 29, 2002, entitled "Aqueous Tissue Clearing Solution". The reference is cited herein for reference. Fluorescent marking or labeling molecules are implanted to label a predetermined portion of the target sample such as some neurons underlie a specific function. The procedure could be achieved by means of genetic engineering, as well known in the art.

Subsequently, the prepared sample is fed to the image data generating system 400. The system 400 includes a laser scanning microscope that is equipped with a plurality of laser light sources. During the procedure, the sample with label is scanned by the laser to activate fluorescent molecules. The cross-sections of the sample at different depth are scanned entirely (or partially) with the laser according to a predetermined sequence. Therefore, the scanned image data include pluralities of surface images at different depth. Images from various parts of the same cross-section can be stitched to its entirety with the help of computer software such as AMIRA. Thereafter, the generated image data are fed in to the process system 100 for subsequent process. As aforementioned, the average model generating module 200 is coupled to the process system 100 to process the input data for generating the three-dimension image or an average model.

The generated average model or three-dimension image data could be stored in the database 600. The database may include a plurality of sub-database such as bio-express sub-database 610, cellular network sub-database 620 and bio-fine structure sub-database 630. As will be understood by persons skilled in the art, the foregoing preferred embodiment is illustrative of the present invention rather than limiting the present invention.

The bio-expression sub-database 610 includes the data of bio-character such as gene (or protein) expressions. The database 610 also includes standard bio-geographic index sub-database, which allows the calibration and comparison between different individuals. All of the data can be classified in accordance with gene (or protein) expressions, individual growth, developmental, disease or experience dependent procedures.

Cellular network sub-database 620 establishes a functional linkage between certain functions (or dysfunctions) and cellular entities. For example, the transient inhibition of dynamin function in the neurons disrupts a certain type of memory formation, establishing a function link between memory and neurons identified by the rsh enhancer trap allele. Please refer to the article "radish Encodes a Phospholipase-A2 and Define a Neural Circuit Involved in Anesthesia-Resistant Memory", to Ann-Shyn Chiang, Current Biology, vol. 14, 263-272, Feb. 17, 2004. The article is incorporated herein for reference.

The fine structure sub-database 630 includes the data of bio-fine structures.

Figure 6:
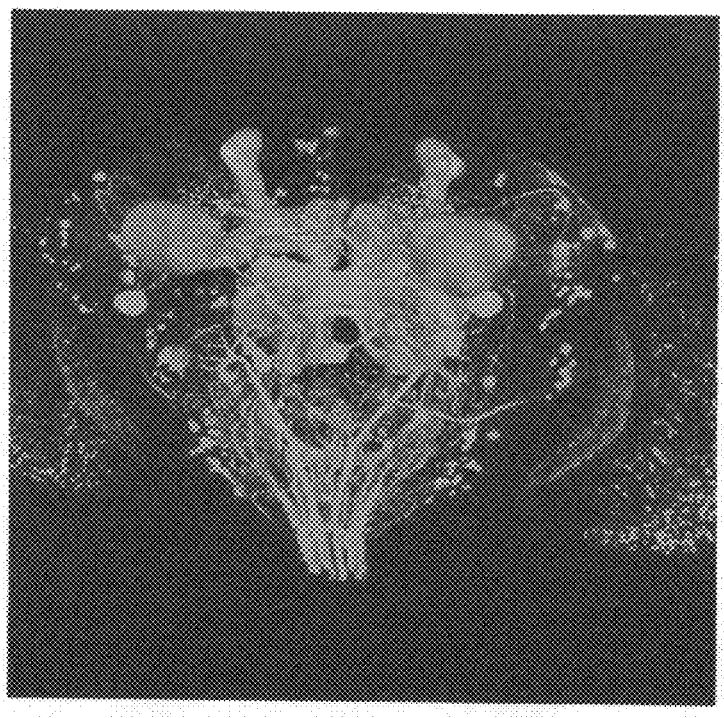
FIG. 6 illustrates an example of the generated 3D sub-structures and neural networks in the fly brain.
Figure 7:
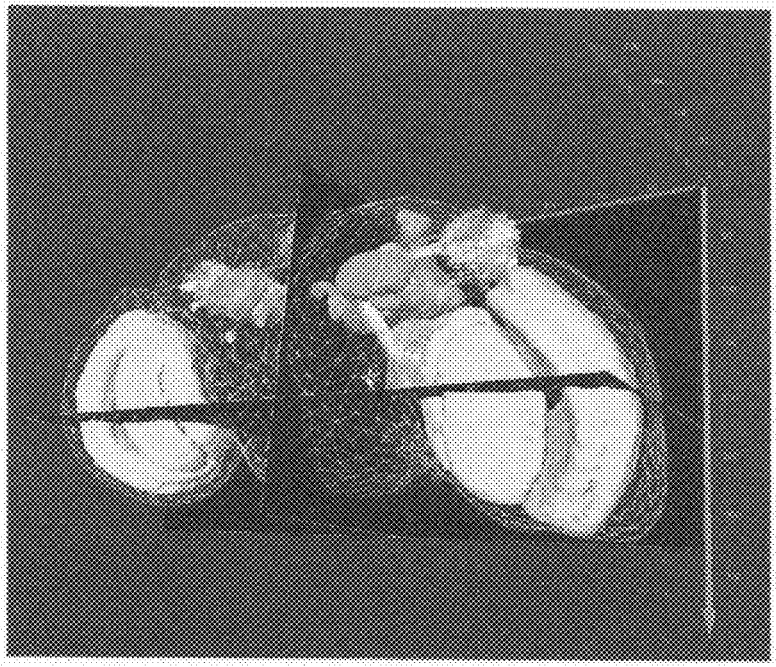
FIG. 7 demonstrates an average model of a fruit fly brain with some of its major sub-structures.
Figure 8:
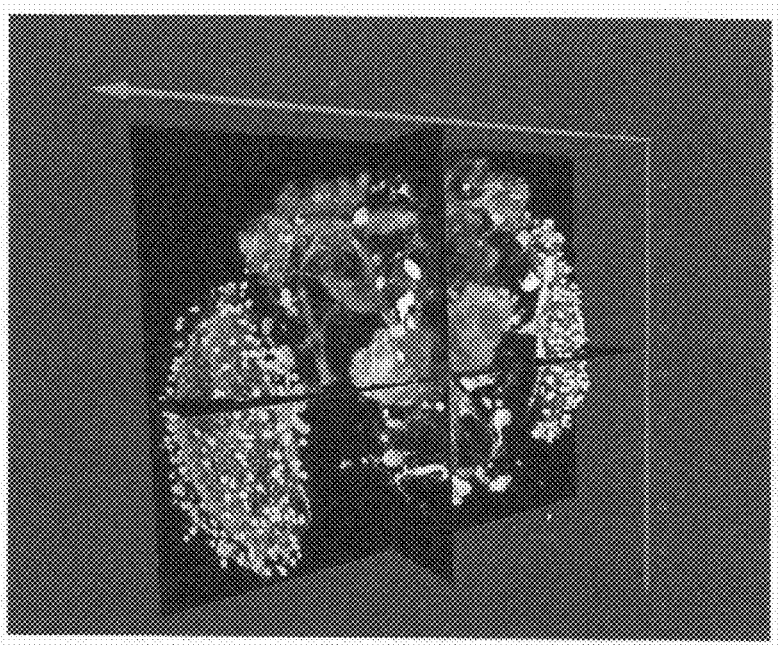
FIG. 8 demonstrates the distribution of some genes within neural networks in a fly brain.

One preferred embodiment is to construct some databases for the fruit fly brain. The gene expression of the fly brain can be presented by the Gal4/UAS-GFP technology, as well known by skilled persons in the art. FIG. 6 illustrates an example of the generated 3D fly brain incorporated herein for reference. The figure shows a 3D image illustrating the distribution of the neurons which express the radish gene in a brain of a male fruit fly. The green color portion represents the expression of radish gene resulted from the fluorescent marking molecule. The larger spots are neurons with a width at about 10 micrometers, while smallest dots are believed to be the synapses, at the size of micron range. The brown color portion is the mushroom body. The averaged standard mushroom body is constructed according to the algorithm used in the average-model module in the process system. All cells can be set in the computed standard brain wireframe by the 3D image generating technology. FIG. 7 shows the location of neurons expressing the GH146 gene (orange) in a standard fly brain model constructed according to its mushroom body (purple). The yellow part is the optical lobe where the visual signal is collected. The blue part is called the central complex. In FIG. 8, several cellular networks expressing different genes in one brain is illustrated, GH146 (green), tim (brown), and 201Y (purple). The tim gene is related to the biological clock in the fruit fly.

From the FIGS. 6 to 8, the bio-structure image can be obtained by means of the present invention. The bio-network images can be stored in a storage medium. The present invention discloses a computer readable storage medium being available to store an image of bio-network generated by performing the following scanning a sample with label by a laser scanning microscope to activate fluorescent molecules in the sample, wherein the laser scanning microscope is equipped with a plurality of laser light sources; during the scanning procedure, at least a part of the sample is scanned by the laser light and cross-sections at different depth are scanned according to a predetermined sequence, thereby obtaining scanned image data including pluralities of surface images at different depth. The images from various parts of the same cross-section can be stitching to its entirety. Objects in three dimensions can be reconstructed by the utilization of computer software such as AMIRA. The present invention further comprises the following steps before scanning the sample: preparing the sample and implanting molecules of fluorescence generating potential in the sample to label a predetermined portion of a target sample by means of genetic engineering. Then, the degree of light transparency of the sample is increased to about 0.15 mm or deeper.

Figure 2:
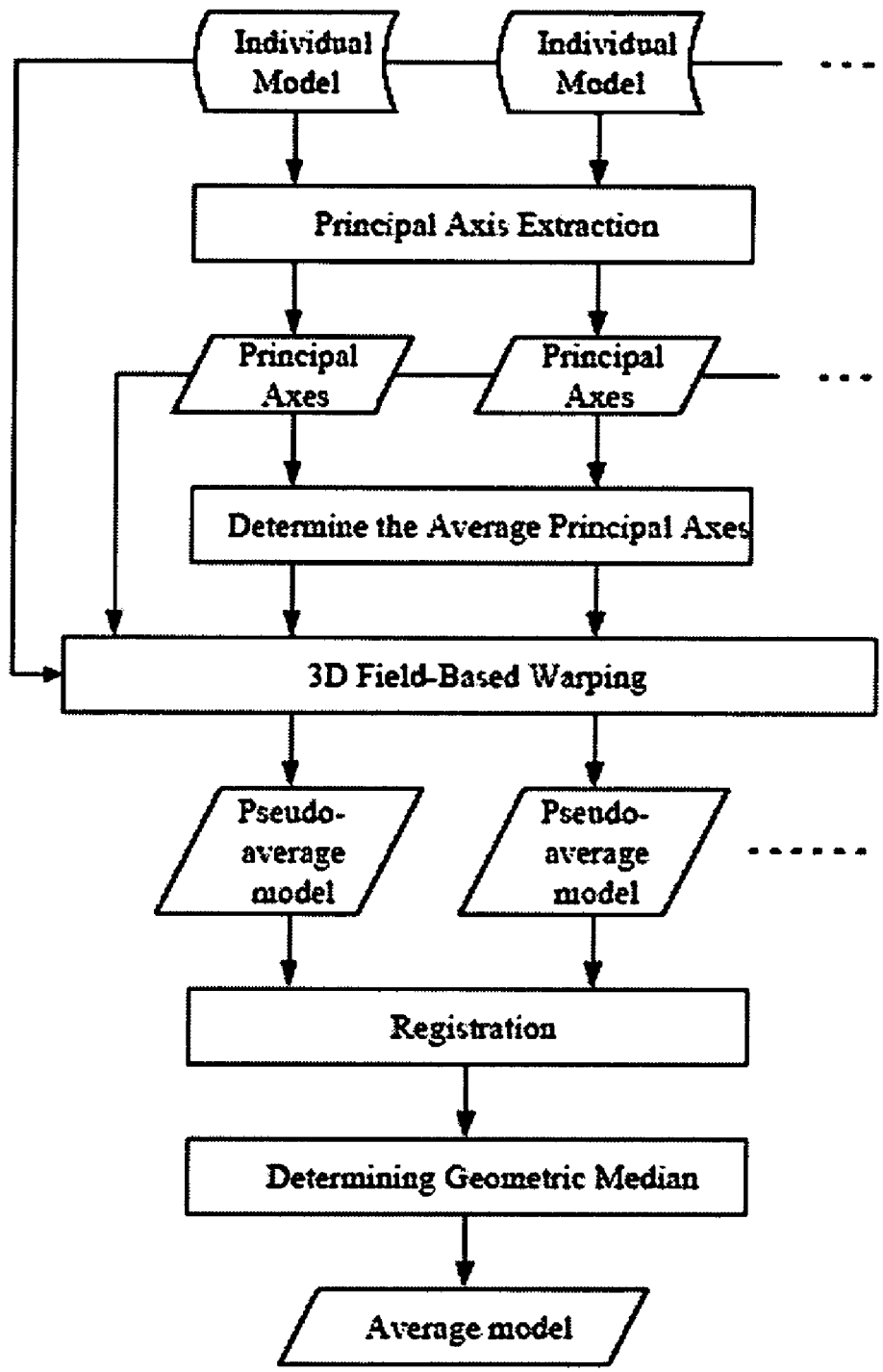
FIG. 2 is the flow chart according to the present invention.

Please refer to FIG. 2, a proposed process flow is to build an average model (3D atlas) from a group of initial individual models. As shown in FIG. 2, the method consists of three main steps, individual model construction and two model-averaging procedures at different levels. The first step is to construct 3D wireframe model for each individual dataset.

Individual Model

After performing 2D segmentation, contour extraction and contour correspondence analyses to the original datasets, applying surface models reconstruction algorithms can yield wireframe model for individual representations. This can be achieved with the help of computer software such as AMIRA.

Principal Axis Extraction and the Principal Axes

The second step is the coarse level model averaging. A partition step is performed to partition each individual model into several significant parts (submodels) with a user interface. For each individual model, a set of principal axes is extracted and can be referred to as skeleton of the model. In the step, the individual model is fed into the process system and the system may process the partition procedure under the input instruction of the user. Each individual wireframe model is partition into several significant parts manually, and then the corresponding principal axis for each submodel is found by the technology of PCA disclosed by Ian T Jolliffe, "Principal Component Analysis", Springer-Verlag, New York, 1986. By calculating eigenvalues and the corresponding eigenvectors of the following sample covariance matrix, the direction of the principal axis is determined:

$$S = \frac{1}{m-1}\sum_{k=1}^{m}(x_k - \mu_x)(x_k - \mu_x)^T$$

Where m is the number of vertices on the submodel, X is the position vectors of these vertices, and $\mu_x$ is the sample mean of X. The direction of principal axis, D, is the eigenvector of S with the minimum engenvalue. The principal axis of the submodel is the rotation axis with minimum rotational inertia for the submodel, and it can be represented as a parametric line segment with parameter t:

$$v(t) = A + t \cdot D, \; t_{min} \leq t \leq t_{max}$$

where A is a point on the principal axis, and be set to $\mu_x$. The boundary, $t_{min}$ and $t_{max}$, can be determined by projection of all submodel vertices to the principal axis. For each individual model, a set of principal axes is extracted and can be referred to as skeleton of the model.

Principal Axis Average:

Still referring to FIG. 2, after the principal axes are determined by the computation performed on the process system or computer. The registration of each individual model should be performed before the averaging procedures. Each individual model can establish a local coordinate system from the relative positions of its own principal axes. Then, each individual model is translated and rotated by the computing system. After applying some translocation and rotation, the original local coordinate system are registered to be consistent with the global axis, the parametric line segment can be computed:

$$v(t) = M + t \cdot D, \; t'_{min} \leq t \leq t'_{max}$$

where M is the middle point on the principal axis, and $$t'_{max} = \frac{1}{2}(t_{max} - t_{min}) = -t'_{min}$$

Averaging procedures are carried out by calculating the average position of the middle points, the average direction and the average length of the principal axis, performed on the computer or the process system of the present invention. Consequently, the average principal axis can be represented as:

$$v(t) = \mu_M + t \cdot \mu_D,$$

$$\overline{t_{min}} \leq t \leq \overline{t_{max}}$$

where $$\mu_M = \frac{1}{n}\sum_{k=1}^{n}M_k,$$

$$\mu_D = \frac{\sum_{k=1}^{n}D_k}{\left\|\sum_{k=1}^{n}D_k\right\|},$$

Figure 3:
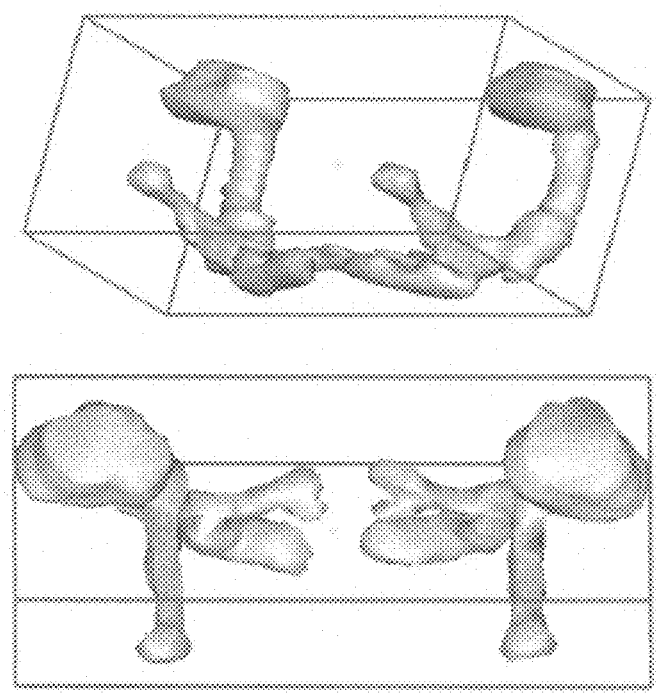
FIG. 3 shows the wireframe model of the mushroom body.
Figure 4:
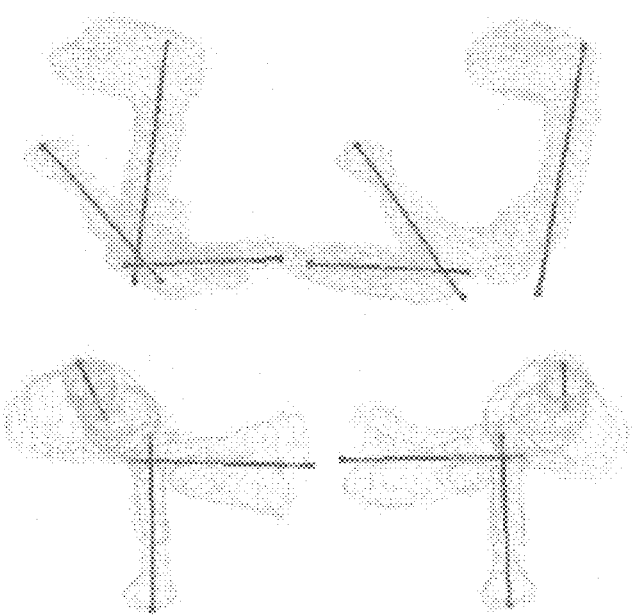
FIG. 4 shows the principal axes and wireframe of the same model of FIG. 3.
Figure 5:
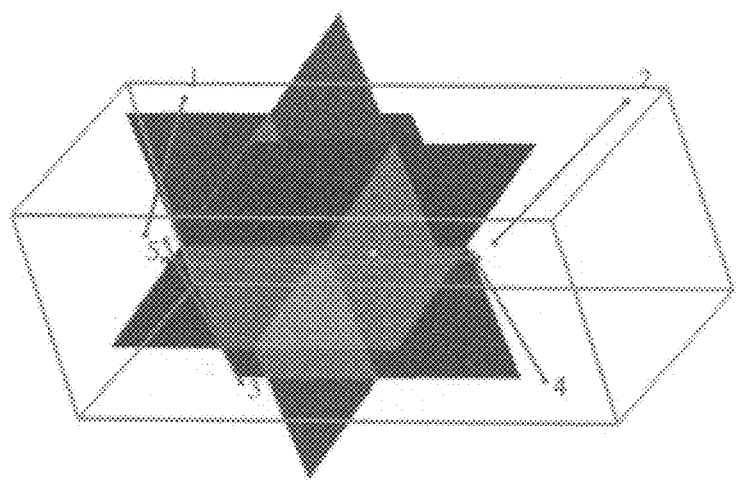
FIG. 5 shows the local coordinate system of the set of principal axes.

-continued $$\overline{t_{max}} = \frac{1}{n}\sum_{k=1}^{n}t'_{max,k} = -\overline{t_{min}},$$

wherein n is the number of individual models. After the process system finish computing the average principal axes for the submodel, the average skeleton of the original datasets is generated by the process system and stored into the memory of the process system 100 or into the database 600 in FIG. 1. FIG. 3 shows the wireframe model of the mushroom body. FIG. 4 shows the principal axes and wireframe of the same model of FIG. 3. FIG. 5 shows the local coordinate system of the set of principal axes.

Three Dimension Field-Based Warping

The next procedure after the average skeleton of original datasets being generated is to warp the stored individual skeleton dataset in three dimensions by the process system 100 of the present invention. Based on the 3D field-based warping algorithm disclosed by J. Gomes et al., entitled "Warping and Morphing of Graphical Objects", Morgan Kaufman Publishers, San Francisco, 1999, the calculation performed on the process system 100 is able to warp each individual model to its corresponding pseudo-average model. The warping function processed by the computer is defined as:

$$W(p) = p + \frac{\sum_{k=1}^{r}w_k\Delta p_k}{\sum w_k},$$

$$\Delta p_k = W_k(p) - p$$

Wherein p is the position vector of vertices on an individual model, and r is the number of principal axes in a set of skeleton. $W_k(p)$ is the warped position of p using a single principal axis pair. The weighting of the k-th principal axis of W(p) is defined as:

$$w_k = \left(\frac{l_k^c}{a + d_k}\right)^b$$

Wherein $l_k$ is the length of the principal axis and its importance is adjusted by the constant c. $d_k$ is the distance from a point p to the principal axis. The constant a means the adherence of the principal axis, and the constant b can be seen as the concentration of the strength of the principal axis.

Final-Level Model Averaging

The pseudo-average model is generated by the process system 100 based on the above model. Then, the pseudo-average models are registered according to the common average skeleton. The final average model can be obtained by determining the geometric median of these pseudo-average models, on the process system 100. For a wireframe model, the triangle patches are converted into volumetric voxels by sampling. A 3D seed-fill algorithm is applied to convert this volumetric hollow object to a volumetric solid object. Each pseudo-average model will generate a volumetric solid object to indicate the volumetric voxels it possesses. A cumulative volume of voxel values from 1 to N is obtained with N pseudo-average models superimposed. The geometric median is located at where the voxel value is N/2. Once the geometric median is determined by the process system 100 and the 3D graphic generating system 200, the final average model can be built.

Virtual Reality Demonstration Facility

A full colored three dimensional stereo neuron graphic can be seen and manipulated with the facilities. In order to reveal the very fine extension of neurites, several facilities are used for the data generating system 400. A Zeiss LSM 510 confocal microscope is equipped with 4 laser light sources including an argon laser (emission at 364 nm), an argon-krypton laser (458, 488, or 514 nm), and two HeNe lasers (543 and 633 nm). The system allows for simultaneous detection of four fluorescence signals and a transmitted image. Zeiss LSM 510 META confocal two-photon microscope system is equipped with 4 laser light sources including an argon-krypton laser (458, 488, or 514 nm), two HeNe lasers (543 and 633 nm), and with a Coherent Mira femtosecond T-Sapphire laser for nonlinear optical microscopy (2-photon) which is capable of 700-1000 nm single optics set tuning. This is designed for in vivo observation of fluorescence signals in thick living tissues. Zeiss LSM 510 META confocal microscope is equipped with 3 laser light sources including an argon-krypton laser (458, 488, or 514 nm), and two HeNe lasers (543 and 633 nm). The system has 3 photomultipliers and a META detector allowing simultaneous collection of full spectrum fluorescence signals. It does not have transmitted light detector. It has an automated stage scanner for image montage and optical system for IR light. For the stereoscopic image presentation, a stereoscopic projecting system 300 is coupled to the process system 100. The process system 100 may access the database under the input instruction and send the image to a video card with multiple graphic outputs (such as NVIDIA Quadro4-980 or better). The CPU in the process system 100 can be a 32-bit or 64-bit (or better) unit(s), with sufficient memories for image data processing. The image from the multiple outputs is individually fed into multiple projectors so that a front or back projection can be implemented for stereoscopic presentation and manipulation. The procedure can be controlled by (but not limited to) commercially available software (such as AMIRA v.3.1) and hardware (such as a 3D mouse). Special glasses as known in the art should be provided for generating the virtual three dimension image. It is well-known in the art, the description is omitted.

As will be understood by persons skilled in the art, the foregoing preferred embodiment of the present invention is illustrative of the present invention rather than limiting the present invention. Having described the invention in connection with a preferred embodiment, modification will now suggest itself to those skilled in the art. Thus, the invention is not to be limited to this embodiment, but rather the invention is intended to cover various modifications and similar arrangements included within the spirit and scope of the appended claims, the scope of which should be accorded the broadest interpretation so as to encompass all such modifications and similar structures. While the preferred embodiment of the invention has been illustrated and described, it will be appreciated that various changes can be made therein without departing from the spirit and scope of the invention.

What is claimed is:

1. A bio-expression system comprising:
   a process system used to process data;
   an average model generating module embedded in said process system, wherein while an input of two-dimensional individual model sections is fed into said process system, said average model generating module is responsive to said input of two-dimensional individual model sections and processes an individual model construction and model-averaging procedure, thereby generating an average model from all the input datasets;
   a database including a bio-expression sub-database, cellular network sub-database and bio-fine structure sub-database, wherein said database is coupled to said process system to store at least said average model, wherein said bio-expression sub-database includes data of bio-character and said bio-fine structure sub-database includes data of bio-fine structures; and
   a stereoscopic projecting system coupled to said process system, to display a stereoscopic image for active or passive virtual reality applications, thereby presenting the bio-expressions, cellular networks or bio-fine structures to express said bio-character or bio-fine structures under the input instruction of said process system.

2. The system of claim 1, wherein said model-averaging procedure includes two averaging stages of different levels.

3. The system of claim 1, wherein said cellular networks includes neural circuits.

4. The system of claim 3, wherein said bio-expressions comprises gene or protein expressions.

5. The system of claim 1, wherein said database further comprises bio-geographic index sub-database, which allows the calibration and comparison between different individuals.

6. The system of claim 1, wherein said bio-expression is classified in accordance with gene expression, individual growth, developmental, disease or experience dependent procedures.

7. The system of claim 1, wherein said cellular network sub-database establishes a functional link between certain functions and neuronal entities.

8. The system of claim 1, further comprising a two-dimensional image data generating system coupled to said process system, said two-dimensional image data generating system including laser scanning microscope that is equipped with a plurality of laser light sources, wherein a prepared sample is fed to said image data generating system, at least partial cross-section of said prepared sample being scanned by said laser light sources and cross-sections at different depth are scanned according to a predetermined sequence, thereby generating pluralities of surface images at different depth for feeding into said process system.

9. The system of claim 8, further comprising a sample preparation system coupled to said two-dimensional image data generating system to generate target samples for said bio-expression system.

10. A computer readable medium containing program instructions for transforming pluralities of scanned two-dimension images of bio-structures into a stereoscopic image of an average model displayed by a stereoscopic projecting system of a bio-expression system of claim 1, wherein said pluralities of scanned two-dimension images are achieved by scanning cross-sections of at least a part of a prepared sample according to a predetermined sequence at different depth by a confocal microscope equipped with a plurality of laser light sources, wherein said computer readable medium containing program instructions to execute following steps comprising:
   inputting individual model sections including data of said two-dimension images to a process system of said bio-expression system for data processing; and
   invoking an average model generating module embedded in said bio-expression system through said process system, wherein said average model generating module is responsive to said input individual model sections to process an individual model construction and model-averaging procedure, wherein said model-averaging procedure includes performing a coarse level model averaging for each of said individual model sections, extracting a set of principal axes to form a skeleton for each of said individual model sections, determining an average skeleton for said individual model sections by said average model generating module by averaging middle points, directions and lengths of all said principle axes in all said individual model sections, storing said average skeleton into a memory of said process system, warping said individual model sections according to said average skeleton in three dimensions with said process system using said average model generating module based on a 3D field-based warping to generate its corresponding pseudo-average model, and performing a fine level of model-averaging by determining a geometric median of said pseudo-average models using said average model generating module to obtain a final average model of said bio-structures, thereby transforming said pluralities of scanned two-dimension images at different depth into said stereoscopic image of said average model in three dimension to represent a three dimensional objects displayed by said stereoscopic projecting system.

11. The computer readable medium of claim 10, wherein said coarse level model averaging includes performing a partition step to partition each of said individual model sections into several submodels with a user interface of said process system.

12. The computer readable medium of claim 10, wherein said model-averaging procedure further comprises:
performing a registration of each of said individual model sections;
establishing a local coordinate system for each of said individual model sections by said average model generating module from relative positions of its own principal axes; and
translating and rotating each of said individual model sections by said process system using said average model generating module; wherein after applying said translation and rotation, an original and coordinates axes of said local coordinate system are registered to be consistent with global axis.

13. The computer readable medium of claim 10, wherein said fine level of model-averaging procedure comprises:
converting triangle patches of said pseudo-average models into volumetric voxels by sampling;
applying a 3D seed-fill algorithm to convert a volumetric hollow object represented by said volumetric voxels to a volumetric solid object, wherein each of said pseudo-average models generates said volumetric solid object to indicate said volumetric voxels it possesses; and
determining said geometric median by using the cumulative volume of voxel values at N/2 as a threshold, N is the number of pseudo-average models superimposed.

14. The computer readable medium of claim 10, wherein said model-averaging procedure further comprises:
stitching automatically images from various parts of the same cross-section to its entirety at all depths; and
reconstructing all the two dimensional cross-sectional images at different depth into three dimensional objects.

15. The computer readable medium of claim 10, further comprising the following steps before scanning cross-sections of at least a part of said prepared sample:
preparing said sample;
implanting label molecules of fluorescence generating potential in said sample to label a predetermined portion of a target sample by means of genetic engineering; and
increasing the degree of light transparency of said sample to about 0.15 mm or deeper.

16. The computer readable medium of claim 10, wherein said bio-structures includes neural networks structures in brains.

17. The computer readable medium of claim 16, wherein said bio-structures includes neural network structures in the fruit fly brain.

* * * * *

UNITED STATES PATENT AND TRADEMARK OFFICE
CERTIFICATE OF CORRECTION

PATENT NO. : 7,742,878 B2
APPLICATION NO. : 11/169890
DATED : June 22, 2010
INVENTOR(S) : Ann-Shyn Chiang et al.

It is certified that error appears in the above-identified patent and that said Letters Patent is hereby corrected as shown below:

Column 12, Line 1
Please delete "coordinates"
and replace with -- coordinate --

Column 12, Line 32
Please delete "networks"
and replace with -- network --

Signed and Sealed this

Twenty-fourth Day of August, 2010

David J. Kappos
*Director of the United States Patent and Trademark Office*